United States Patent [19]

Floyd et al.

[11] Patent Number: 4,672,996
[45] Date of Patent: Jun. 16, 1987

[54] SELF-REGULATING VALVE

[75] Inventors: Terry S. Floyd, Clover, S.C.; Wyatt P. Hargett, Jr., Matthews, N.C.

[73] Assignee: CEM Corporation, Matthews, N.C.

[21] Appl. No.: 868,171

[22] Filed: May 22, 1986

Related U.S. Application Data

[63] Continuation of Ser. No. 722,266, Apr. 11, 1985, abandoned.

[51] Int. Cl.$^4$ ............................................. F16K 15/14
[52] U.S. Cl. ................................... 137/522; 137/468; 137/859; 220/209
[58] Field of Search ................... 220/209; 222/402.21, 222/494; 137/496, 468, 859, 522

[56] References Cited

U.S. PATENT DOCUMENTS

| | | | |
|---|---|---|---|
| 1,925,926 | 9/1933 | Kunkel | 222/494 |
| 2,854,996 | 10/1958 | Hughes | 137/859 X |
| 2,942,614 | 6/1960 | Lardner | 137/859 X |
| 3,160,329 | 12/1964 | Radic | 137/859 X |
| 3,265,084 | 8/1966 | Wagner | 137/859 X |
| 3,804,113 | 4/1974 | Garcea | 137/859 X |
| 3,827,456 | 8/1974 | Sheppard | 137/859 |
| 4,020,828 | 5/1977 | Steed | 137/859 X |
| 4,061,254 | 12/1977 | Nilson | 222/494 |
| 4,400,401 | 8/1983 | Beauvais et al. | |
| 4,474,211 | 10/1984 | Lucas | |
| 4,474,314 | 10/1984 | Roggenburg | 222/494 |
| 4,493,444 | 1/1985 | Del Bon et al. | |

FOREIGN PATENT DOCUMENTS 2603712  8/1977  Fed. Rep. of Germany ...... 137/859

OTHER PUBLICATIONS

Abu-Samra et al., *Analytical Chemistry*, 47, 1475 (1975).
Barrett et al., *Analytical Chemistry*, 7, 1021 (1978).
Nadkarni, *Analytical Chemistry*, 56, 2233 (1984).
Matthews et al., Bureau of Mines Technical Progress Report 120 (Apr. 1983).
Operation and Service Manual, Microwave Drying/Digestion System, Model MDS-81, CEM Corporation (revised Mar. 1985).

*Primary Examiner*—Robert G. Nilson
*Attorney, Agent, or Firm*—Timothy R. Kroboth

[57] ABSTRACT

The present invention provides an improved valve. This valve opens and closes in response to a change in the physical environment of the valve. This valve is particularly suited as a relief valve in a microwave system-based, closed vessel digestion procedure. This valve includes a pressure-deformable, resilient wall member having a fluid vent port, and an obstructing member that cooperates with the wall member to open and close the valve. Also provided is a lidded vessel employing this improved valve, an apparatus that includes a microwave system and this lidded vessel, and methods using this improved valve.

10 Claims, 4 Drawing Figures

SELF-REGULATING VALVE

This application is a continuation of application Ser. No. 722,266, filed Apr. 11, 1985, now abandoned.

TECHNICAL FIELD

The present invention relates to an improved valve. More particularly, this invention relates to a valve that opens and closes in response to a change in the physical environment of the valve, and that is especially useful as a relief valve. Furthermore, this invention pertains to a lidded vessel including this improved valve, and to uses of this valve.

BACKGROUND ART

As exemplified by A. Abu-Samra et al., *Analytical Chemistry*, 47, 1475 (1975), and P. Barrett et al., *Analytical Chemistry*, 7, 1021 (1978), a microwave oven-based, digestion technique using an acid digesting agent in an open vessel, is known. Barrett et al. report that this procedure decreases digestion time, compared to a hot plate heat source.

Also known, as illustrated by Nadkarni, *Analytical Chemistry*, 56, 2233 (1984), and S. A. Matthews et al, Bureau of Mines Technical Progress Report 120 (April 1983) is a microwave oven-based, digestion technique using an acid digesting agent in a closed system. In Nadkarni's procedure, a covered Teflon ® or polycarbonate beaker was placed in a partially evacuated, closed, glass desiccator so that acid fumes leaking from the covered beaker were trapped within the glass desiccator. A polycarbonate bottle with a polypropylene screw cap was used as a closed digestion vessel by Matthews et al., who cautioned against explosion caused by pressure build up within a closed vessel and observed leaking of some acid fumes around the bottle caps during pressure dissolution. Matthews et al. report that, compared to open vessel digestion, closed vessel digestion prevents the introduction of contaminating elements and the loss of volatile elements and compounds.

Accordingly, although closed system digestion has been found to have advantages over open vessel digestion, the containing vessel in a closed system could explode under pressure build up, with spewing of acid. The explosion hazard is enhanced, for example, if, as in tissue digestion, gas is generated by the digestion process. As a result, open vessel digestion is commonly utilized, particularly if the digestion process generates gas.

A lidded digestion vessel suitable for use in a microwave system-based digestion that employs a corrosive digesting agent, is available from Savillex Corporation either with or without an outlet port in the lid. This lidded vessel is formed of a deformable, resilient, highly chemically inert, thermoplastic material. This material is a fluorocarbon copolymer in which the carbon-fluorine backbone in the main chain is connected with perfluoroalkoxy side chains through oxygen links. This fluorocarbon copolymer is marketed by Dupont Corp. under the trademark Teflon ® PFA.

Prior art valves are exemplified by U.S. Pat. Nos. 4,474,211 to Lucas, 4,493,444 to Del Bon et al, and 4,400,401 to Beauvais et al. The Del Bon et al patent is directed to a self-closing valve-and-lid assembly. The Lucas patent pertains to a valve that includes a disc-like member through which apertures extend, and an aperture closing device having a pressure responsive flex web with openings offset from the apertures. The Beauvais et al patent relates to a method using microwave energy for sterilizing and canning food products within a nonmetallic enclosure cover having an aperture controlled by a check valve regulated by a weight. Within the enclosure cover, a non-metallic jar with a nonmetallic lid having a vent hole closed by a vent closure, contains the food product.

Also known in the prior art is a manually operated, dispensing valve formed by an opening in a metallic can lid top, a resilient rubber insert located inside the lid top and having an outlet port portion that extends through the lid top, and a plastic pin element. The plastic pin element has a disc-like part with a raised portion that seats against the rubber insert to close the valve, and has a pin-like part that extends through the outlet port portion of the rubber insert for engagement with a nozzle. The valve is opened by finger pressure exerted against the nozzle.

Prior work known to us is a beryllium-copper spring, needle check valve of Lois B. Jassie and H. M. Kingston. This valve attaches to an outlet port of a closed digestion vessel, as a pressure relief valve for explosion prevention. Because the beryllium-copper spring does not absorb microwave radiation, this valve is usable in a microwave system-based digestion procedure. However, a drawback is that beryllium is oxidizable, especially in an acid fume environment, to beryllium oxide, which results in the valve no longer being acceptable for use in a microwave system. Moreover, beryllium oxide is carcinogenic.

Therefore, there is a need for an improved valve that could be used as a pressure relief valve for explosion prevention in a microwave system-based, closed vessel digestion procedure. Such an improved valve would be of even greater usefulness if it were self-closing after excess pressure had been relieved, and thereby could function as more than a one time pop-off valve. Such an improved valve would provide an even greater contribution to the art if it relieved pressure not only in response to a predetermined internal fluid pressure but also in response to temperature change. Such a valve would provide an improved apparatus for microwave system-based, closed vessel digestion.

Moreover, an improved valve of this type would be especially advantageous if it could also be manually opened. This improved valve would be especially remarkable if the components thereof could be of the same non-metallic material. Furthermore, such an improved valve would be of enhanced utility if it had a broad range of applications.

DISCLOSURE OF THE INVENTION

It is accordingly an object of the present invention to provide an improved valve that could be used as a pressure relief valve for explosion prevention in a microwave system-based, closed vessel digestion procedure.

It is a further object of the present invention to provide an improved relief valve that is self-closing after excess pressure has been relieved, and thereby functions as more than a one time pop-off valve.

It is an even further object to provide an improved valve that relieves pressure not only in response to a predetermined internal fluid pressure but also in response to temperature change.

It is a still further object to provide an improved apparatus for microwave system-based, closed vessel digestion utilizing this valve.

It is an additional object to provide an improved valve of this type that can be manually opened.

It is an even additional object to provide an improved valve the components of which may be non-metallic and of the same material.

It is another object to provide an improved valve having a broad range of applications.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided a valve responsive to a predetermined internal fluid pressure. This valve includes a pressure-deformable, resilient wall member having a fluid outlet port. The valve further includes an obstructing member engaged in a tight sealing relationship with an inside surface of the wall member or with an inner surface of the outlet port. As a result, outflow through the outlet port is blocked when internal fluid pressure impinging on the wall member is insufficient to cause deformation thereof that overcomes the tight sealing relationship.

The wall member is sufficiently pressure-deformable that the force of the predetermined internal fluid pressure acting thereon, causes deformation thereof that overcomes the tight sealing relationship, thereby opening the valve to permit pressure relief through the outlet port. The resiliency of the fluid pressure-deformed, wall member is sufficient to cause the wall member to reengage in the tight sealing relationship when internal fluid pressure impinging on the wall member becomes less than the predetermined internal fluid pressure, thereby closing the valve. Accordingly, this valve opens and closes in response to a predetermined internal fluid pressure. In a preferred embodiment, this valve is sensitive not only to internal fluid pressure but also to temperature.

Also provided by the present invention is a lidded vessel that employs the improved valve of the present invention.

In addition, there is provided an apparatus that includes a microwave system and a lidded vessel employing the improved valve of the present invention. In a preferred embodiment, the microwave system includes a corrosion resistant chamber, a corrosion resistant exhaust system capable of providing high volume air flow through the chamber, an element for absorbing excess reflected radiation, and a computer-controlled variable power source. The lidded vessel is microwave transparent.

Also provided by the present invention are methods using the improved valve of the present invention. These methods include use in canning a food product, sterilizing an object, and dispensing a fluid at a desired temperature.

In the drawing and in the detailed description of the invention that follows, there are shown and essentially described only preferred embodiments of this invention, simply by way of illustration of the best mode contemplated by us of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention, and which depicts preferred embodiments of an improved valve in accordance with the present invention and uses of the improved valve.

BEST MODE FOR CARRYING OUT THE INVENTION

As explained earlier, the present invention is directed to an improved valve. More particularly, this invention relates to a self-regulating valve that opens and closes in response to a change in the physical environment of the valve, in particular to a change in internal fluid pressure. In a preferred embodiment, this improved valve is also temperature sensitive, and therefore able to respond not only to internal fluid pressure but also to temperature change. In this embodiment, the components of the valve can amazingly be made of the same material. Also in this embodiment, the valve is microwave radiation transparent and is therefore useful as a relief valve in a microwave system-based, closed vessel digestion technique, even when the digestion generates gas. In a very preferred embodiment, the improved valve is highly chemically inert and accordingly corrosion resistant. Also in a preferred embodiment, the improved valve of this invention can be manually opened.

Also as explained earlier, our invention is directed to a lidded vessel employing this improved valve, to an apparatus including a microwave system and this lidded vessel, and to methods using the improved valve.

The term "fluid" as used in our description of the present invention and in the claims, means a liquid, gas or vapor, and the terms "upper", "lower", "above", "below", "upward" and "downward" are intended to designate relative orientation of the valve as shown in the Figures.

Figure 1:
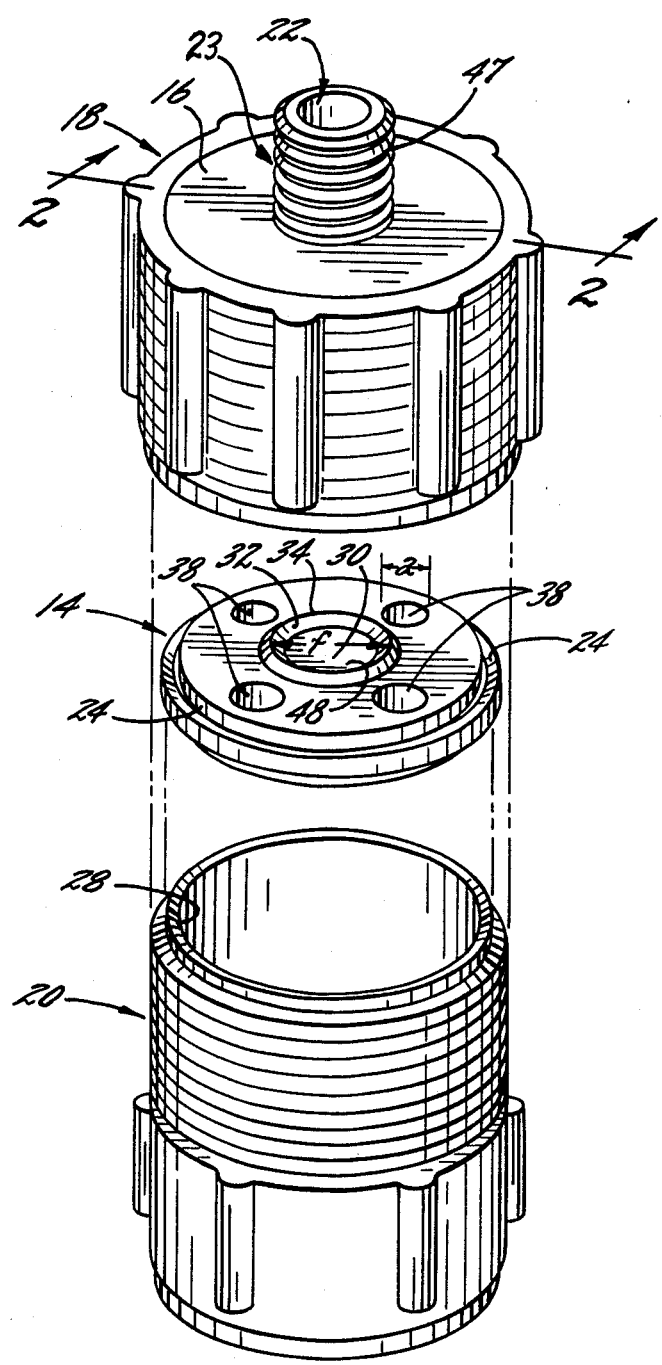
FIG. 1 is an isometric view of the components of a lidded vessel employing a very highly preferred embodiment of a valve in accordance with the present invention.
Figure 3:
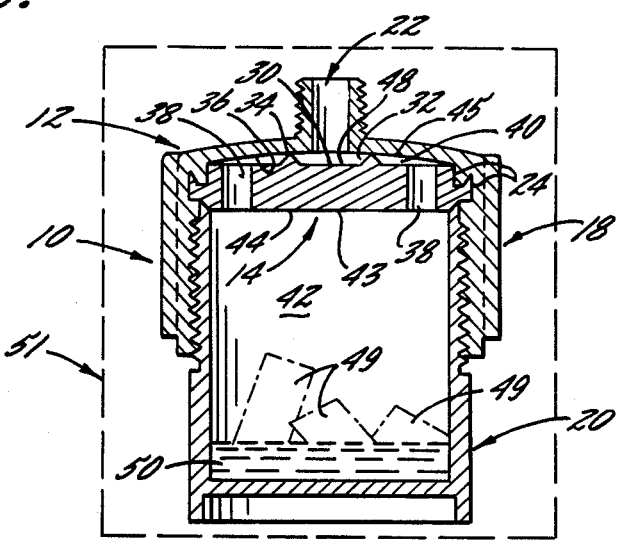
FIG. 3 is a sectional view of the assembled lidded vessel and member 12 of FIG. 1 taken in a plane through the central assembly axis, showing the valve in closed position and depicting contents in phantom within the lidded vessel.
Figure 4:
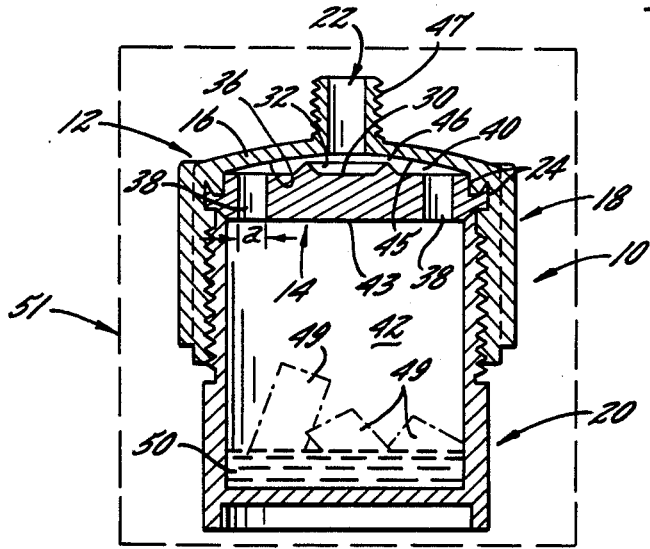
FIG. 4 is a sectional view identical to that of FIG. 3, except that the valve is shown in open position in response to a certain fluid pressure within the lidded vessel.

FIGS. 1, 3 and 4 depict a lidded vessel 10 utilizing a very highly preferred embodiment of a valve 12 in accordance with the present invention. Valve 12 is formed by a disc-shaped member 14, and a deformable, resilient top wall 16 of a lid 18 of a hollow receptacle or container 20. Centrally located in the lid is a fluid outlet port 22. Lid 18 includes an upright sleeve 23 that extends the outlet port above wall member 16.

Preferably, disc-shaped member 14 and the entirety of lidded vessel 10 are formed of a deformable, resilient, thermoplastic material, that is very preferably the same for each of member 14, the lid and the container. Even more preferably, this material is the fluorocarbon copolymer described earlier. Preferably, the cross-sectional thickness of disc 14 imparts semi-rigidity to the disc.

Disc 14 has a peripheral wall surface 24 that conforms to an upper inside wall surface 26 of the lid, and enables the disc to be locked in place between the lid and an upper rim 28 of container 20. Encircling, and spaced apart from, a center 30 of the disc is a raised abutment ring 32 having a peak 34, which provides point contact between the disc and an inner surface 36 of lid top 16. As can best be seen in FIG. 1, located between ring 32 and peripheral wall surface 24 are apertures 38, each having a flow area "A", defined by a diameter "a".

Figure 2:
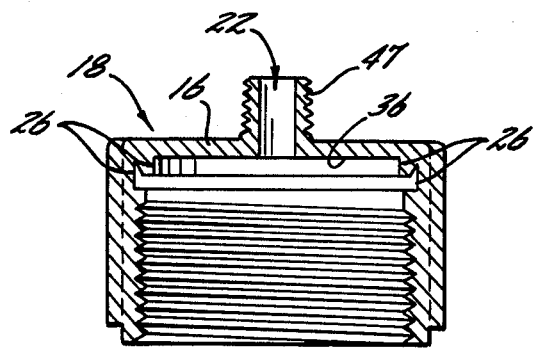
FIG. 2 is a cross-sectional view of the lid of the lidded vessel of FIG. 1 along the line 2—2.

With reference to FIG. 3, which shows valve 12 in closed position, the abutment ring peak of semi-rigid disc 14 pushes against flexibly deformable, lid top 16 so as to cause the lid top to bulge outwardly. Outward bulging of the lid top is seen by comparison to the undistorted lid shown in FIG. 2. The point contact provided by the abutment ring peak produces a tight sealing relationship between ring 32 and inner lid top surface 36.

Peak 34 is appropriately spaced apart from center 30 of the disc such that it surrounds outlet port 22 of the lid, thereby obstructing flow through the outlet port. The outlet port and abutment ring could be offset from the central assembly axis, provided that they are so located relative to one another in the assembled valve, that the abutment ring peak surrounds the outlet port.

As shown in FIGS. 3 and 4, disc 14 divides lidded vessel 10 into compartments 40 and 42. Apertures 38 permit internal fluid pressure to be equally exerted against lid top 16 and other walls of the lidded vessel. The number of apertures, whether one or many, is not critical; rather, the sum of areas "A" of the apertures should not restrict flow to the cap.

So long as the force of the internal fluid pressure acting on lid top 16 is less than or only equal to the pressure of abutment ring 32 against the lid top, valve 12 remains closed. Internal fluid pressure pushing against a central area 43 of a lower disc surface 44, assists the mechanical pressure exerted by the abutment ring to strengthen the tight sealing relationship between peak 34 and inner top surface 36. Hence, the force of internal fluid pressure is utilized to enhance closure of the valve. Central area 43 is defined by a diameter "f" of the abutment ring peak.

A donut-shaped area 45, which consists of the area of inner lid top surface 36 outside the abutment ring peak, is conveniently greater than central area 43. Since the lid top is more flexible than the disc, central area 43 could be greater than area 45.

If, as illustrated in FIG. 4, the force of the internal fluid pressure impinging on lid top 16 should exceed the pressure of abutment ring 32 against the lip top, the lid top is lifted away from sealing contact with abutment ring peak 34, and valve 12 is opened. A gap 46 is created between peak 34 and inner lid top surface 36, through which pressure is released from the lidded vessel, via fluid outlet port 22.

When a sufficient reduction in the force of the internal fluid pressure acting on the lid top has occurred, the resiliency of deformable, resilient top wall 16 causes disc 14 and inner lid top surface 36 to reseat in a tight sealing relationship, thereby closing the valve.

Should the force of the internal fluid pressure impinging on the lid top again exceed the pressure of the abutment ring against the lip top, valve 12 will reopen, until the fluid pressure within the lidded vessel drops sufficiently for the valve to reclose. Thus, opening and closing of the valve in response to the internal fluid pressure within the lidded vessel, recurs as required.

The internal fluid pressure required to open valve 12 is controlled by factors including the height and the diameter of abutment ring peak 34, and the flexibility of the lid top. For example, the greater the height of peak 34, the relatively greater the pressure needed; the greater the diameter of the ring peak, the relatively greater the pressure required; and the more flexible the lid top, the relatively less pressure needed. Accordingly, by selection for example of an appropriate peak height or ring peak diameter, the valve can be made to open at a predetermined internal pressure.

Attention is invited to our later description, which illustrates the relationship between diameter of the ring peak and the internal pressure needed to open valve 12. As described later, valve 12 is responsive not only to internal fluid pressure but also to temperature change.

If disc 14 were flexible, rather than semi-rigid, the disc would be seen bowed downwardly in FIG. 3 and lid top 16 would show less outward bulging. For a constant height of peak 34 and diameter of ring 32, a relatively higher internal pressure would be needed to open valve 12, if the disc were flexible, rather than semi-rigid. If, on the other hand, the disc were rigid rather than semi-rigid, internal pressure pushing against central area 43 of the lower disc surface would not strengthen the tight sealing relationship between peak 34 and inner top surface 36. When the disc is flexible, the internal pressure required for valve opening is less predictable than when the disc is rigid or semi-rigid.

When used with a lidded vessel, valve 12 is operable regardless whether a small volume of liquid is used, or the lidded vessel is filled to capacity.

Advantageously, valve 12 can be manually opened by exerting finger pressure against an outer wall 47 of sleeve 23 in a direction generally perpendicular to the central assembly axis of the valve. This type of finger pressure will move inner lid top surface 36 out of the tight sealing relationship with the abutment ring peak. Valve 12 can be maintained open by pressure exerted through the outlet port on an upper disc surface 48.

FIGS. 3 and 4 depict lidded vessel 10 containing in phantom, solids 49 and a liquid 50, to which microwave energy is applied by means of a microwave 51, also shown in phantom. Solids 49 may be, for example, a sample to be digested such as a gas-generating tissue sample. In this case, liquid 50 would be a digesting agent such as an acid digesting agent. Solids 49 may also be a food product to be canned using microwave energy, in which case liquid 50 would contain water; or solids 49 may be objects to be sterilized using microwave energy, in which case liquid 50 would include water.

To take advantage of the manual release feature of valve 12, lidded vessel 10 could contain a fluid to which microwave energy is applied to heat the fluid and build up internal pressure for manual release of the warm or hot fluid. Exemplary fluids include, but are not limited to, a gas, a foam, a semi-fluid mixture such as a slurry, or a liquid such as a semi-solid or an emulsion. Illustrative semi-solids include gels and pastes.

For example, container 20 could be filled with a suitable shaving cream composition, and the lidded vessel assembled with disc-shaped member 14 in place. The contents of the assembled vessel could then be heated by microwave radiation for a desired period of time. The lidded vessel could then be inverted, and valve 12 manually opened to release a warm or hot shaving cream composition. It will be appreciated that the lidded vessel is refillable, as the lid could be removed and additional material could be added to the container for dispensing or discharge.

It will be noted that the fluid pressure opening valve 12 is in the same upward direction as the mechanical pressure being exerted on deformable lid top 16.

Preferably, the same material is used to form all components of our improved valve. As a result, one valve component will not become hotter than another valve component. The containers of the lidded vessels of FIGS. 1 and 3-6 are preferably formed of the same material as the pressure-deformable wall member, which results in a vessel-protecting effect. However, in some applications, a valve in accordance with the present invention is used with a container formed of a different material. For example, the valve could be formed of thermoplastic components, but the container could be formed of glass.

For use in a microwave system, the improved valve of the present invention should be microwave radiation transparent. This characteristic is achieved if the valve is made of a microwave transparent, thermoplastic material. Preferably, the same material is used to form all valve components. Exemplary microwave transparent, thermoplastic materials include, but are not limited to, polypropylene, polyethylene, polypropylene/polyethylene copolymers, and the fluorocarbon copolymer described earlier. The fluorocarbon copolymer advantageously provides a high temperature, corrosion resistant valve.

As later described in more detail, a valve in accordance with the present invention is temperature sensitive when the pressure-deformable wall member thereof is made of a thermoplastic material. Illustrative thermoplastic materials for providing a temperature sensitive valve include those just described. Advantageously, a useful thermoplastic material is moldable and precision machinable.

An eminently useful microwave system for digestion procedures is characterized by a corrosion resistant interior chamber, a corrosion resistant exhaust system capable of providing high volume air flow through the chamber, means for absorbing excess reflected radiation, and a computer-controlled variable power source. A microwave system of this type is commercially available under the trademark MDS-81 from CEM Corporation, Matthews, N.C.

Further details of the present invention are now provided based on trials carried out in an MDS-81 microwave system, using a valve in accordance with the present invention as a relief valve for a lidded digestion vessel obtained from Savillex Corporation. Water is added to the vessel, the lid of which is provided with a vent port, and the lidded vessel is assembled with semi-rigid, disc-shaped member 14 in place, to form valve 12. Member 14, which is made of the thermoplastic fluorocarbon copolymer described earlier, has an abutment ring peak that is 0.062 inch high, and four apertures equally spaced around the abutment ring each with a diameter of $\frac{1}{8}$ inch. The lower disc surface has a diameter of 1.53 inches. When the diameter of the abutment ring peak is $\frac{1}{2}$ inch, this valve opens at about 60 psi internal pressure. In comparison, if the diameter across the ring peak is $\frac{5}{8}$ inch, the valve opens at approximately 80 psi internal pressure, and if the ring peak diameter is $\frac{3}{4}$ inch, the valve opens at about 95 psi internal pressure.

A valve in accordance with the present invention in which the pressure-deformable, resilient wall member is made of a thermoplastic material, is not only pressure sensitive but also temperature sensitive: as the temperature of the pressure-deformable wall member increases, elasticity of the material thereof increases, and the valve opens at a relatively lower pressure. For example, as just described, when the disc of valve 12 has a ring peak diameter of $\frac{1}{2}$ inch, the valve opens at about 60 psi for water. In this instance, vapors within the lidded vessel, result in top wall 16 of the lid being at a temperature of approximately 150° C. In contrast, if a liquid were used having a boiling point appropriate for producing a lid top temperature of about 60° C., the valve would open at approximately 110 psi internal pressure.

When using valve 12 for closed vessel digestions, the manual opening feature of the valve makes it possible to check for high pressure within the closed vessel, prior to opening the closed vessel to remove a digested sample.

In carrying out a closed vessel digestion, it will generally be undesirable for the relief valve to open, as digesting agent fumes may escape. However, when the digestion generates a gas, opening and reclosing of the valve will be beneficial.

As can be seen, a valve in accordance with the present invention, is capable of containing a high pressure, that is, a pressure of more than about 50 psi. Accordingly, the improved valve makes possible a closed vessel digestion at high pressure, with the strength of the lidded vessel walls being an important limitation on the internal pressure. For example, we experienced a blow-out of a bottom wall of a Savillex lidded digestion vessel at about 150 psi. In contrast, the prior art, closed vessel digestion procedures described earlier, experienced leakage at considerably lower pressures. High pressure digestions should further reduce digestion time.

A thermoplastic lidded vessel such as vessel 10 may be heat treated to reduce deformability of the walls thereof. Heat treating or annealing is carried out at an appropriate temperature for a suitable period of time to obtain walls having the desired reduced deformability. For example, lidded vessel 10 could be heated at about 200° C. for about 72 hours.

The self-regulating valve of the present invention can be also used with a microwave system for enabling chemical starting materials to be reacted at a desired pressure and temperature, and dispensing or discharging the reaction product at a desired temperature; or for simply dispensing or discharging a fluid at a desired temperature. Exemplary fluids include, but are not limited to, a gas, a foam, a semi-fluid mixture such as a slurry, or a liquid such as a semi-solid or an emulsion. Illustrative semi-solids include gels and pastes. Use of the valve for dispensing or discharging a fluid at a desired temperature avoids the need for temperature-sensing devices and related temperature-actuated devices.

The manual release feature of, for example, valve 12 may also be used for discharging, for purposes of illustration, a pressured fluid, such as grease, from a hose or conduit, on one end of which disc-shaped member 14 and a closure element are in place.

In the preceding description of the present invention, there are shown and essentially described only preferred embodiments of this invention, but as mentioned above, it is to be understood that the invention is capable of changes or modifications within the scope of the inventive concept expressed herein. Several changes or modifications have been briefly mentioned for purposes of illustration.

INDUSTRIAL APPLICABILITY

The improved valve of this invention is useful as a relief valve, for example, in a microwave system-based, closed vessel digestion procedure. Further uses of the valve in combination with a microwave system, include canning a food product, sterilizing an object, or dispensing a fluid such as a gas, a foam, a semi-fluid mixture such as a slurry, or a liquid such as a semi-solid or an emulsion.

We claim:

1. A self-opening and self-closing relief valve for providing flow out of a closed system in response to a certain internal fluid pressure, said relief valve comprising
   (a) a dome-shaped, pressure-deformable wall member having an outlet port, and
   (b) an abutment integral with a support member therefor, said abutment being spaced apart from a center of said support member and having a circumferential peak adapted to surround said outlet port and forming a valve seal with an inside surface of said dome-shaped wall member when internal fluid pressure impinging on said dome-shaped wall member is insufficient to break said valve seal;
   wherein said dome-shaped wall member is an integral part of a closure element, and said abutment support member has a peripheral wall surface that is adapted to interlock with, and that is in an interlocking relationship with, an inside wall surface of said closure element;
   wherein said abutment support member comprises means for enabling internal fluid pressure impingement on said dome-shaped wall member, said impingement-enabling means being located between said abutment and said peripheral wall surface;
   wherein said dome-shaped wall member comprises means for manual relief of internal fluid pressure, said means for manual relief being a sleeve integral with said dome-shaped wall member, that extends said outlet port above said dome-shaped wall member;
   wherein said dome-shaped wall member is sufficiently fluid pressure-deformable that said certain internal fluid pressure acting thereon, breaks said valve seal to permit outflow through said outlet port; and
   wherein the fluid pressure-deformed, wall member is sufficiently resilient that said valve seal is reformed when internal fluid pressure becomes less than said certain internal fluid pressure.

2. The relief valve of claim 1, wherein said abutment support member is semi-rigid.

3. The relief valve of claim 1, wherein said abutment support member is a disc-shaped element.

4. The relief valve of claim 1, wherein said abutment is ring-shaped.

5. The relief valve of claim 1, wherein said abutment support member is formed of a thermoplastic material.

6. The relief valve of claim 1, wherein said dome-shaped wall member is formed of a thermoplastic material, whereby said relief valve is also temperature sensitive.

7. The relief valve of claim 1, wherein said dome-shaped wall member and said abutment support member are formed of the same thermoplastic material.

8. The relief valve of claim 7, wherein said thermoplastic material is moldable and precision machinable.

9. The relief valve of claim 1, wherein said dome-shaped wall member is an outer wall member.

10. The relief valve of claim 1, wherein said closure element is a lid.

* * * * *

UNITED STATES PATENT AND TRADEMARK OFFICE
CERTIFICATE OF CORRECTION

PATENT NO. : 4,672,996
DATED : June 16, 1987
INVENTOR(S) : TERRY S. FLOYD

It is certified that error appears in the above-identified patent and that said Letters Patent is hereby corrected as shown below:

On the Title Page, Item [19] "Floyd et al. should read

-- Floyd --.

Item [75] Inventors, should read [75] Inventor:

-- Terry S. Floyd --.

Signed and Sealed this

Twelfth Day of January, 1988

Attest:

DONALD J. QUIGG

Attesting Officer

Commissioner of Patents and Trademarks